United States Patent [19]

Iijima

[11] Patent Number: 5,437,028
[45] Date of Patent: Jul. 25, 1995

[54] FILE MANAGEMENT SYSTEM WITH FILE-SIZE FLEXIBILITY

[75] Inventor: Yasuo Iijima, Yokohama, Japan

[73] Assignee: Kabushiki Kaisha Toshiba, Kawasaki, Japan

[21] Appl. No.: 215,733

[22] Filed: Mar. 22, 1994

[30] Foreign Application Priority Data

Mar. 29, 1993 [JP] Japan .................. 5-069777

[51] Int. Cl.⁶ .................. G06F 12/00; G06F 13/00
[52] U.S. Cl. .................. 395/600; 395/400; 395/425; 364/DIG. 1
[58] Field of Search .................. 395/600, 400, 425; 364/DIG. 1

[56] References Cited

U.S. PATENT DOCUMENTS

| | | | |
|---|---|---|---|
| 4,893,236 | 1/1990 | Ohnishi et al. | 364/405 |
| 4,939,669 | 7/1990 | Nishimo | 364/519 |
| 5,038,539 | 8/1991 | Kelley et al. | 52/239 |
| 5,060,170 | 10/1991 | Bourgeois et al. | 364/521 |
| 5,161,256 | 11/1992 | Iijima | 902/26 |
| 5,193,171 | 3/1993 | Shinmura et al. | 395/425 |
| 5,226,155 | 7/1993 | Iijima | 395/600 |
| 5,237,682 | 8/1993 | Bendert et al. | 395/600 |
| 5,289,470 | 2/1994 | Chang et al. | 370/94.1 |

FOREIGN PATENT DOCUMENTS 0446940  9/1991  European Pat. Off.
2635886  3/1990  France.

*Primary Examiner*—Thomas G. Black
*Assistant Examiner*—Jean R. Homere
*Attorney, Agent, or Firm*—Cushman, Darby & Cushman

[57] ABSTRACT

In an IC card, a memory is divided into a plurality of files and data management of each divided file is performed. The IC card comprises a size allocation section for allocating an optional file size to each file, and a control section for performing a control operation so that size management may be effected according to the size allocated by the size allocation section in which an instruction section for commanding that size management should not be performed in each file is included.

17 Claims, 8 Drawing Sheets

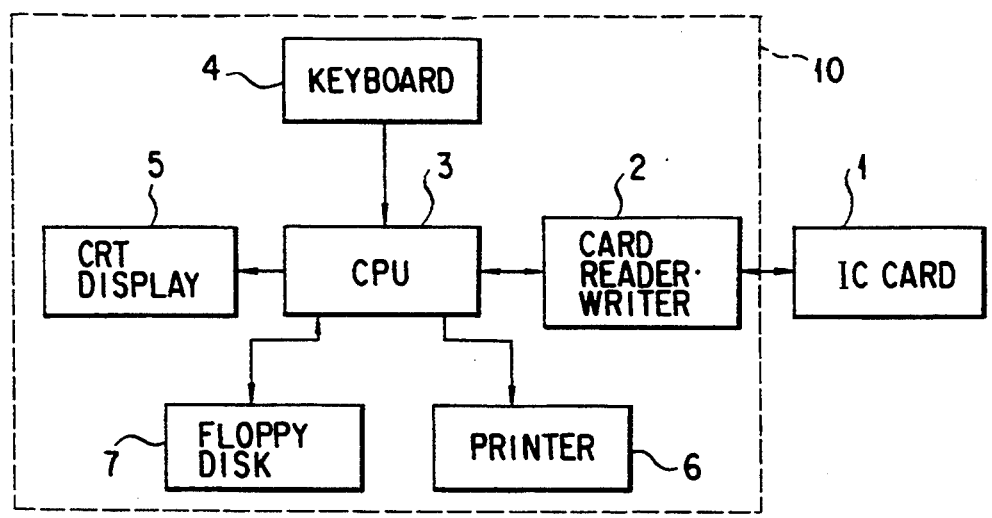
F I G. 1
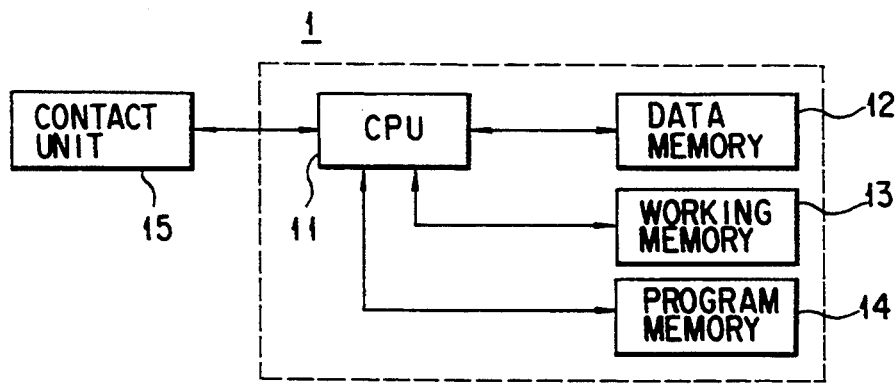
F I G. 2
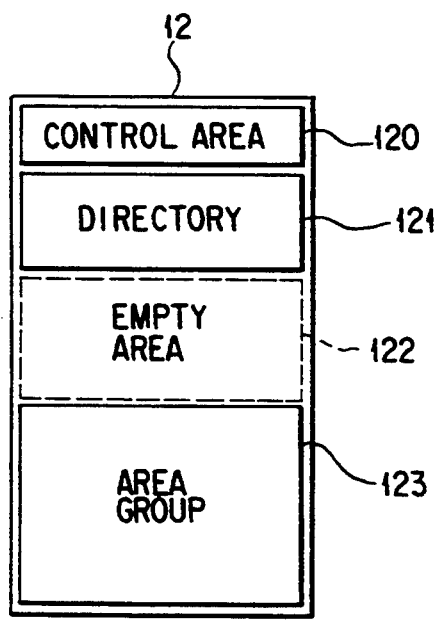
F I G. 3

FIG. 4

| DFSN | |
|---|---|
| #1 | 01 | DF1 DEFINITION WORD (00) |
| #2 | 01 | KEY AREA 1 DEFINITION WORD |
| #3 | 01 | DATA AREA 1 DEFINITION WORD |
| #4 | 02 | DF2 DEFINITION WORD (00) |
| #5 | 02 | KEY AREA 2 DEFINITION WORD |
| #6 | 01 | KEY AREA 3 DEFINITION WORD |
| #7 | 00 | KEY AREA 4 DEFINITION WORD |
| #8 | 03 | DF3 DEFINITION WORD (02) |
| #9 | 03 | KEY AREA 5 DEFINITION WORD |
| #10 | 04 | DF4 DEFINITION (02) |
| #11 | 04 | KEY AREA 6 DEFINITION WORD |
| #12 | 01 | DATA AREA 2 DEFINITION WORD |

FIG. 5A

| PTN | DFSN | DFID | NL | DF name | BCC |

FIG. 5B

| PTN | DFSN | PFSN | DFS | AAID | TYPE | DFAC | DFST | US | BCC |

FIG. 5C

| PTN | DFSN | AID | ATOP | ASIZ | AAC | AST | BCC |

FIG. 5D

| PTN | DFSN | KID | KTOP | KSIZ | KAC | KST | BCC |

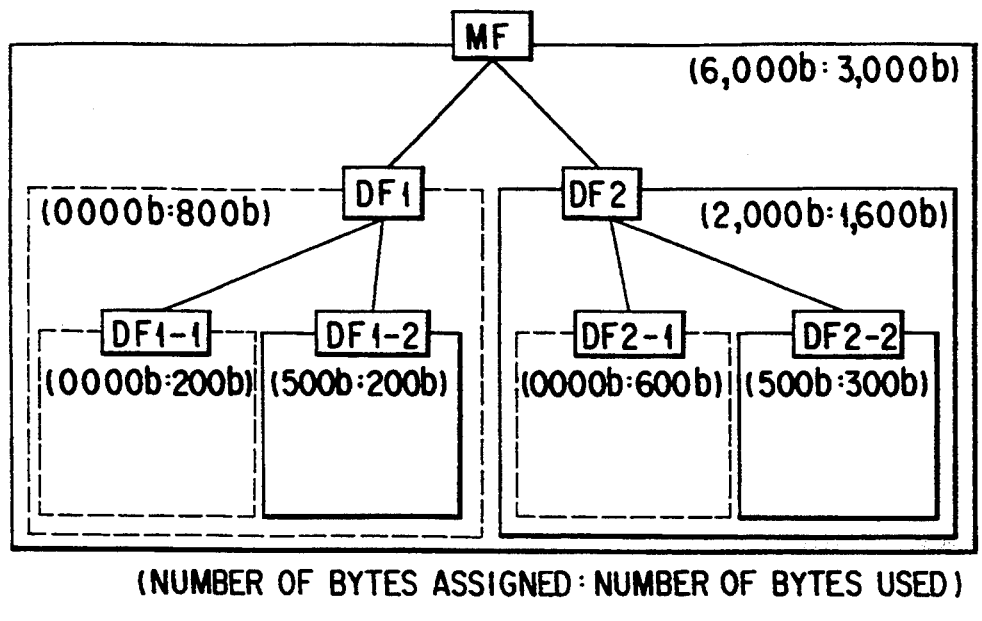
(NUMBER OF BYTES ASSIGNED : NUMBER OF BYTES USED)
F I G. 6
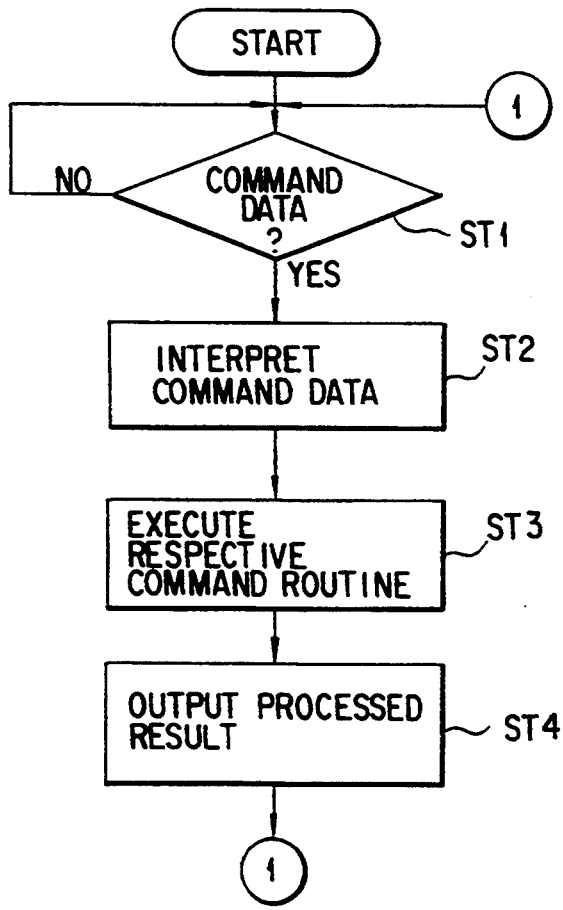
F I G. 7

FIG. 8A | DFID | NL | DF name | TYPE | DFS | AAID | DFAC |
(FUNCTION CODE)

FIG. 8B | AID | ASIZ | AAC |
(FUNCTION CODE)

FIG. 8C | KID | KSIZ | BS | KAC |
(FUNCTION CODE)

FIG. 8D | DFID | KID | KSIZ | BS | KAC |

FIG. 12 | FUNCTION CODE | NL | DF name | DFS |

FIG. 14 | FUNCTION CODE | NL | DF name | SW |

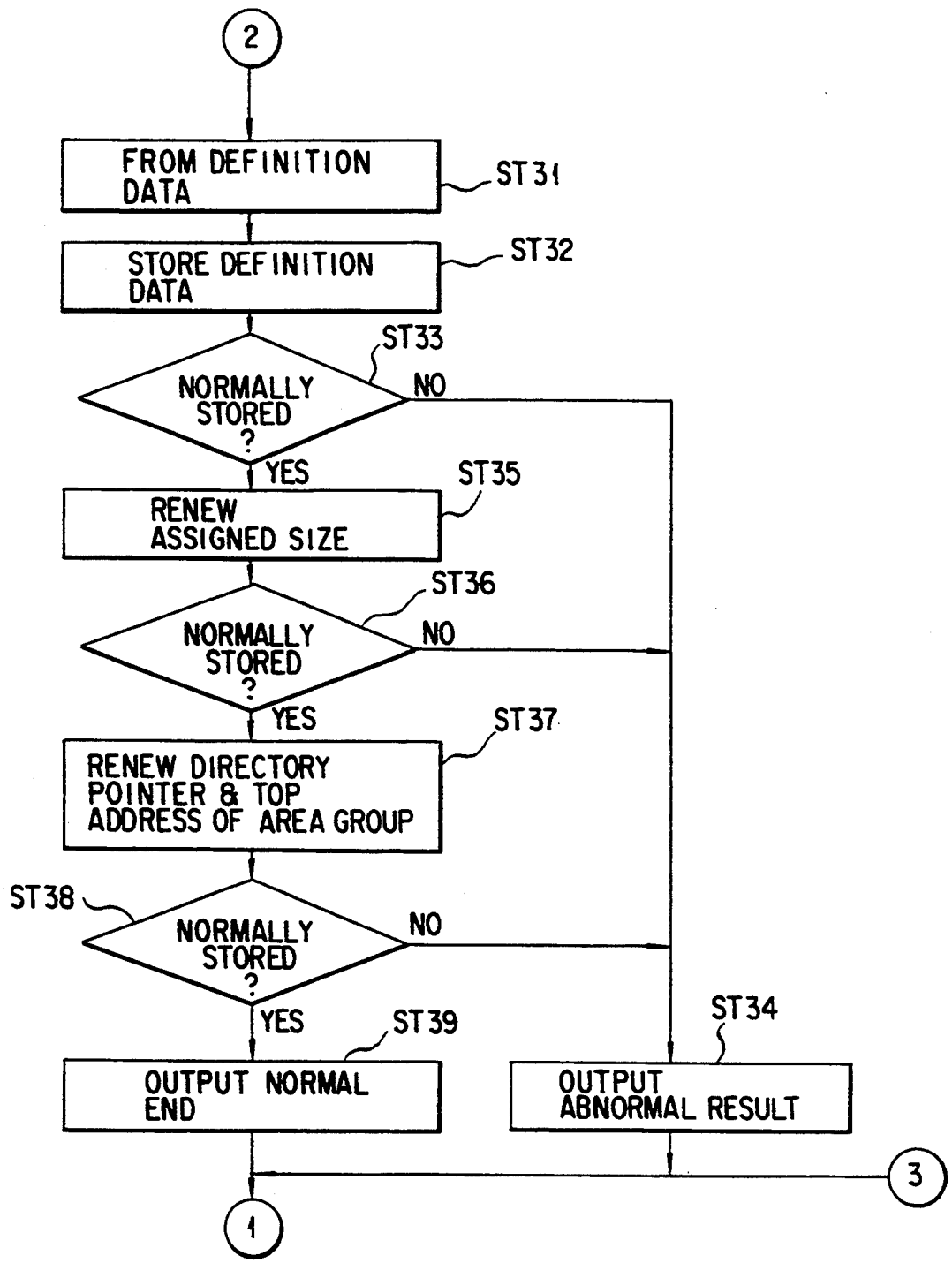
F I G. 10

FILE MANAGEMENT SYSTEM WITH FILE-SIZE FLEXIBILITY

BACKGROUND OF THE INVENTION

1. Field of the Invention

This invention relates to a file management system which gives flexibility to the sizes of divided files set in a memory in an electronic apparatus such as an IC card containing a nonvolatile memory and an IC chip having a control element, like a CPU, that controls the memory.

2. Description of the Related Art

Presently, IC cards containing nonvolatile data memories and IC chips with control elements, including CPUs, that control those memories are attracting attention as portable data process/memory mediums.

An IC card of this type is known in U.S. Pat. No. 5,226,155 in which a built-in data memory is divided into a plurality of files and data to be utilized when the card is used in an application is stored in each file. By entering an application identification name into the IC card from an external device, only a corresponding file is selectively brought into a usable state. With this file selection, multipurpose application can be achieved by grouping a plurality of application data items into files and storing them into a single IC card. These application files include a plurality of data files for storing data such as transaction data.

These application files are added with size data. When the data files are created in the application files, whether or not these data files can be created on the basis of the size of memory used for these files and the size given to the application files. By doing this, the memory areas of applications are prevented from interfering with one another.

With the above method, however, the sizes of application files are set previously, which therefore makes it impossible to change the sizes later. For example, it is assumed that 1000 bytes are given to a file used in application A and 2000 bytes are given to a file used in application B. Even if only 500 bytes out of the given 1000 bytes are used in application A and another 500 bytes are required in application B in the course of executing the two applications, they must be executed within the range of the given size.

Accordingly, the file (500 bytes) for use in application B will not suffice the efficiency of execution for an application.

SUMMARY OF THE INVENTION

Accordingly, the object of the present invention is to provide a file management system which eliminates the necessity of setting the upper limit to the size of a data file corresponding to an application, enables areas to be added when necessary at the time of operation, and allows mixing use of applications with and without the upper file-size limit.

An aspect of the invention is a data filing system wherein a memory is divided into a plurality of file groups and data management of each divided file group is performed, the data filing system comprising: size allocation means for allocating an optional file size to each file; control means for performing a control operation so that size management may be effected according to the size allocated by the size allocation means; and instruction means for commanding that size management should not be performed in each file.

Another aspect of operation of the invention is a data filing apparatus wherein a memory is divided into a plurality of file groups and data management of each divided file group is performed, the data filing system comprising: size allocation means for allocating an optional file size to each file; control means for performing a control operation so that size management may be effected according to the size allocated by the size allocation means; and instruction means for setting identification information as to whether or not to perform size management for file attribute information to command that size management should not be performed in each file.

Still another aspect of the present invention is a file management apparatus wherein a memory is divided into groups of a plurality of files, each group having a parent file and a plurality of files depending to the parent file to arrange the divided files as a hierarchical structure, the apparatus comprising: storage means for storing definition data of the files having the hierarchical structure, the definition data including size data for defining sizes of the files and specified data representing that a size is not defined; means for detecting whether an interested file is defined that the size thereof is defined or not according to the definition data stored in the storage means; means for detecting an unused size of an upper order file on which is depended the interested file, when it is detected that the size of the interested file is not defined; a first means for executing a process to the file within a range of the unused size of the interested file stored in the storage means when the size of the interested file is defined; and second means for executing a process to the file within a range of the unused size of the upper order file detected by the detecting means when the size of the interested file is not defined.

With this invention, an optional file size is allocated to each file, size management is performed according to the allocated size, and instructions are given not to effect size management in each file. This makes it unnecessary to set the upper limit to the size of a file corresponding to an application, thereby enabling the addition of areas as required at the time of operation. In addition, it is possible to use both applications with the upper file-size and those without the upper file-size limit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram of a card processing apparatus to which an IC card associated with an embodiment of the present invention is applied;

FIG. 2 is a block diagram of the IC card;

FIG. 3 is a memory map showing an example of the data memory layout;

FIG. 4 is a drawing of the layout of a directory set in the data memory;

FIGS. 5A to 5D are drawings of examples of the formats of various definition information sets;

FIG. 6 is a drawing to help explain mixing use of applications with and without data file-size management;

FIG. 7 is a flowchart for explaining an instruction data input routine;

FIGS. 8A to 8D are drawings of the formats of file or area creation commands;

FIG. 10 is a flowchart for explaining the operation of creating a file and an area;

FIG. 12 is a drawing of the format of a file size change command;

FIG. 14 is a drawing of the format of a data file select command,

DETAILED DESCRIPTION OF THE PREFERRED EMBODIMENT

Figure 9:
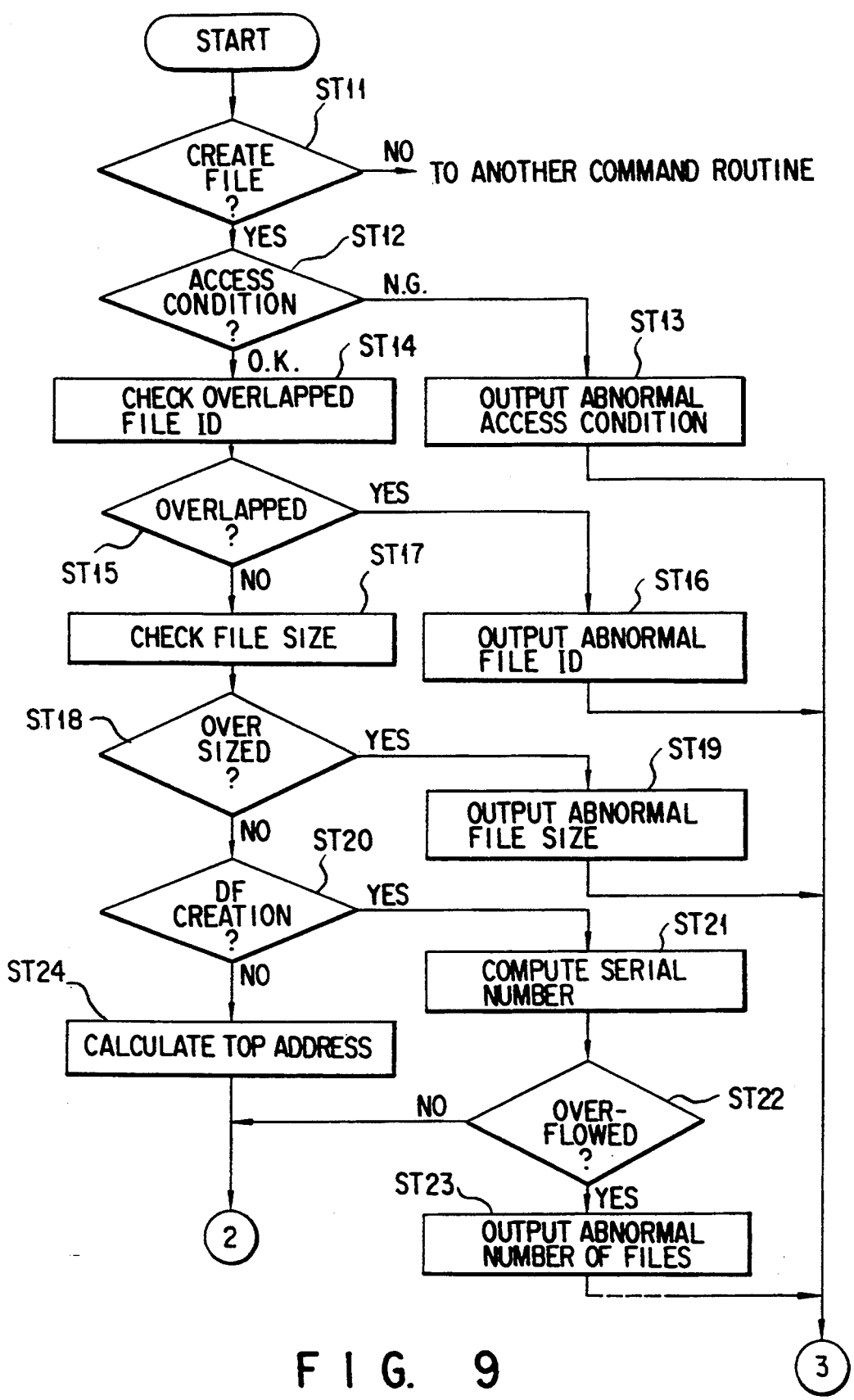
FIG. 9 is a flowchart for explaining the operation of creating a file and an area.

Hereinafter, an embodiment of the present invention will be explained with reference to the accompanying drawings, FIG. 1 shows an example of the structure of a card processing apparatus 10 to which an IC card that is a portable electronic apparatus associated with the present invention is applied. The card processing apparatus 10 is used as a terminal device in a bank system or a shopping system, for example. Specifically, in the device 10, the inserted IC card 1 is connected via a card reader/writer 2 to a control section 3 composed of a CPU. To the CPU 3, a keyboard 4, a CRT display unit 5, a printer 6, and a floppy disk unit 7 are connected.

FIG. 2 shows an example of the structure of the IC card 1. The IC card 1 comprises a CPU 11 as a control unit, a nonvolatile data memory 12 from which the stored data cannot be erased, a working memory 13, a program memory 14, and a contact unit 15 for electrically connecting to the card reader/writer 2. Of these, the parts in the broken-line box (the CPU 11, data memory 12, working memory 13, and program memory 14) are squeezed into a single IC chip, which is embedded in the IC card body. They may be put in two or more IC chips.

The data memory 12 is used to store various types of data and is composed of an EEPROM. The working memory 13 temporarily stores the data processed or to be processed when the CPU 11 performs processing, and is composed of a RAM. The program memory 14 is made of, e.g., a mask ROM, and stores programs for the CPU 11.

The data memory 12 is, for example, divided into a control area 120, a directory area 121, an empty area 122, and an area group 123, as shown in FIG. 3. The area group 123 can contain a plurality of data areas and a key area, and be grouped using the concept of data file (DF). MFs (master files) explained later are managed collectively as a form of data file.

The data file is a file for collectively managing data areas used in a corresponding application and a key area.

The data area stores data (e.g., transaction data) that is written or read as required by means of the terminal unit 10.

The key area is used to store, e.g., the user code number of an IC card 1, and can be written into, rewritten into, and collated with, but not read from.

These data areas and the key area are allocated collectively as the area group 123. The CPU 11 recognizes the physical positions of these files and areas, using the directory 121 in the data area 12.

The control area 120 of FIG. 3 stores the top address information about the area group 123 and the top address information about the empty area 122.

The various definition information sets are stored collectively in the directory 121 as shown in FIG. 4. As shown in the figure, a DFSN (file serial number) is automatically added to each definition information set at the time of file creation. On the basis of this DFSN and the serial number of the parent file stored in the data-file definition information set, the CPU 11 recognizes the relationship between the individual files.

For example, it is found that key area 3 defined by the key area 3 definition information set stored in the sixth field (#6) belongs to DF 1 (data file 1), because DFSN is "01."

Similarly, it is found that key area 6 defined by the key area 6 definition information set stored in the eleventh field (#11) is under DF4 and this DF4 is an area under DF2.

A size information item is allocated to each of these data files so as to indicate the upper limit of the total size of data files under each file. The size information item contains two types. When the size information item indicates "0000," it is recognized that the data file has no upper limit.

The directory 121 of FIG. 3 stores various definition information sets corresponding to the individual data files and areas as shown in FIGS. 5A to 5D.

FIG. 5A shows an information set defining a data file name. This definition information set is made up of data PTN for identifying data-file name definition information within the directory 121, a file serial number DFSN (data file serial number) allocated to this data file, data DFID (data file identification data) for identifying this data file, a file name DF name (data file name) given to this data file as well as data NL (net length) indicating the length of the name, and data BCC (block check character) for checking the validity of these data items.

FIG. 5B shows an information set defining data-file management information. This definition information set is composed of data PTN for identifying data-file name definition information within the directory 121, a file serial number DFSN allocated to this data file, the serial number PFSN (parent file serial number) of the parent file of this data file, a data file size DFS (data file size), AAID (additional area identification data) for identifying a data area in which additional information about this data file, TYPE for determining whether to output the additional information or not, DFAC (data file access condition) indicating the conditions for accessing this data file, DFST (data file status) for holding the status of this data file, the number of bytes US used in the data files and areas under this data file, and data BCC for checking the validity of these data items.

When the data file is selected by a data-file select command explained later, AAID outputs the contents of the data area specified in the file, as required.

The MF (master file) has no data-file name definition information set shown in FIG. 5A.

FIG. 5C shows an information set defining an area for storing various transaction data items. This definition information set is made up of data PTN for identifying area definition information within the directory 121, the serial number DFSN of the data file to which this area belongs, an identification number AID (area identification data) used in accessing the area, ATOP (area top address) indicating the top address of the area, ASIZ (area size) indicating the area size, AAC (area access condition) indicating the conditions for accessing the area, AST (area status) for holding the status of the area, and data BCC for checking the validity of these data items.

FIG. 5D shows an information set defining an area for storing various key data items. This definition information set is made up of data PTN for identifying key area definition information within the directory 121, the serial number DFSN of the data file to which this area belongs, an identification number KID (key identification data) used in accessing the area, KTOP (key top address) indicating the top address of the area, KSIZ (area size) indicating the area size, KAC (area access condition) indicating the conditions for accessing the area, KST (area status) for holding the status of the key, and data BCC for checking the validity of these data items.

The identification information PTN used in these information sets contains one byte. "00" is set to define a data-file name (FIG. 5A), "01" is set to define data-file management information (FIG. 5B), "02" is set to define a data area (FIG. 5C), and "03" is set to define a key area (FIG. 5D).

These items of the definition information are stored in the directory 121 as shown in FIG. 4, wherein data file serial numbers (DFSN) are applied automatically to the respective information when the file creation is executed. Relations with respect to the respective files are recognized by the CPU 11 in accordance with the DFSN and the serial number of the parent file stored in the data file definition information.

For example, the key area 3 defined by the definition information for defining the key area 3 stored at the sixth location #6 can be recognized to correspond to the data file 1 (DF1), since the data file serial number is indicated as "01".

The key area 6 defined by the definition information for defining the key area 6 stored at the eleventh location #11 can be recognized as it is under the data file DF4 which is under the data file DF2.

These data files are applied with size data defined by the definition information for representing the upper limit of the total size of all data files belonging to that parent file. The size data is constituted by two bytes. However, if the size data is constituted by "0000", then the corresponding data file is recognized as it has no upper limit.

FIG. 6 shows an example of mixed data files with and without size management. In the figure, the solid-line boxes denote data files (MF, DF2, DF1-2, DF2-2) instructed to perform size management, each of which has the size expressed by the number of bytes as shown. The broken-line boxes represent data files (DF1, DF1-1, DF2-1) instructed not to perform size management. As shown, size values are specified by a file creation command (explained later) for the data files performing size management. For those not performing size management, "0000" is specified as the size value.

In FIG. 6, (6000 b (byte): 3000 b (byte)) in the master file (MF) means that the MF size allocated to the master file that the first issuer is allowed to use is 6000 bytes and the total size of files under the MF is 3000 bytes. Specifically, the total number of bytes indicating the area size directly under each file is expressed as (the number of bytes used in that file)—(the total number of bytes used in the lower order data files under that file).

For example, the number of bytes used in the data file DF1 is 800 bytes and the number of bytes used in the DF2 (because the DF2 is previously given the size, the number of bytes used is as many as viewed from the MF, regardless of whether the allocated number of bytes is used or not) is 2000 bytes. Thus, it is recognized that the total number of bytes used in the areas under the MF is 200 bytes (3000−2000−800=200 bytes).

Similarly, it is recognized that the total number of bytes used in the areas directly under the DF1 is 100 bytes (=800−500−200) because 500 bytes are already allocated to the DF1-2. It is also recognized that the total number of bytes used in the areas directly under the DF2 is 500 bytes (=1600−600−500) because 500 bytes are already allocated to the DF2-2.

File size management is effected in such a manner that when a data file or area is created under a file, controlling is effected so as to create the file or area within the allocated size.

In the example of FIG. 6, when a data file or an area is created in each file, the remaining size will be recognized on the basis of the following correspondence:

(1) When an area or a DF is created directly under the MF:
   (MF size)—(the size used in MF)
(2) When an area or a DF is created directly under the DF1:
   (MF size)—(the size used in MF)
(3) When an area is created directly under the DF1-1:
   (MF size)—(the size used in MF)
(4) When an area is created directly under the DF1-2:
   (DF1-2 size)—(the size used in DF1-2)
(5) When an area or a DF is created directly under the MF2:
   (DF2 size)—(the size used in DF2)
(6) When an area is created directly under the DF2-1:
   (DF2 size)—(the size used in DF2)
(7) When an area is created directly under the DF2-2:
   (DF2-2 size)—(the size used in DF2-2)

Specifically, when a file or an area is created under a file, an unused size is computed on the basis of the allocated size and the used size managed by a file performing size management found in a higher level including the current file.

For example, when in FIG. 6, the DF1-1, DF1, and MF are the current files, the MF corresponds to the file performing size management. When the DF1-2, DF2, and DF2-2 are the current files, each corresponds to the file with size management. When the DF2-1 is the current file, the DF2 corresponds to the file with size management.

When data is to be written into a file whose size is not managed, an empty area size of that file is first calculated.

For example, the size of the files DF1-1 and DF1-2 are not designated. Therefore, adaptable file size can be allocated to these files. In the case of the file DF1-1, it is possible to store the data of up to 3200 bytes (3000 bytes+200 bytes), since the upper order file DF1 is the no size management file and 3000 bytes (6000 bytes−3000 bytes=3000 bytes) in the MF file are remained as an unused size.

In the case of the file DF2-1, the upper order file DF2 is the size management file, the remaining file size should be obtained by referring to this file DF2. Thus, 2000 bytes−1600 bytes=400 bytes are recognized as an unused size. Therefore, 400 bytes+600 bytes=1000 bytes can be used to write data.

In the files DF1-1 and DF2-1, the size data of these files are renewed after the data is written into these files and the data representing the used file size of the upper order files should also be renewed.

Now, the operation of the IC card 1 will be explained referring to FIG. 7.

As shown in the figure, when the IC card 1 is inserted in the terminal unit 10, the contact section 15 is connected to the card reader/writer 2. This allows the terminal unit 10 to supply power and a reset signal to the card, which is thus electrically activated. Then, at step ST1, control goes to an instruction data wait state. At this point of time, instruction data is being waited for when the data is entered, control proceeds to step ST2, where the instruction data is decoded and the function code at its beginning is extracted. Then, control goes to a corresponding instruction routine. After this, at step ST3, processing is effected in the instruction routine. The result of the processing is outputted at step ST4, and then control returns to an instruction data, or, command, wait state.

FIGS. 9 and 10 are flowcharts for explaining the operation of creating a file. When receiving various commands (explained later) as shown in FIGS. 8A to 8D, the IC card 1, on the basis of the function code at the beginning of each command, recognizes that it is a file creation command at step ST11 of FIG. 9. Then, processing is effected according to the flowcharts in FIGS. 9 and 10. Here, it is assumed that the command in FIG. 8A is a file creation command.

First, at step ST12, whether or not the command execution conditions are fulfilled is judged on the basis of the collation conditions and the access conditions determined in the current file. If it is judged that accessing cannot be effected (N.G.), control will go to step ST13, where response data will be outputted which indicates that the access conditions are invalid. Then, control returns to a command wait state in FIG. 7.

If it is judged that accessing can be effected, a check will be made at step ST14 to see if the allocated DFID (identification information) specified in the command is present in the current data file. If it is present, control will go from step ST15 to ST16, where response data will be outputted to indicate abnormality in that the two items of the ID information are identical. Then, control returns to a command wait state.

In this case, because it is the data file creation command of FIG. 8A, another check is made at step ST14 to see if the data file name (DF name) specified in the command is present in the IC card 1. If it is present, at step ST14, response data will be outputted which indicates that the ID are duplicated erroneously. Then, control returns to a command wait state. If it is not present, control proceeds to step ST17.

At step ST17, a check is made to see if the net size NL given in the command is valid. At this time, when it is a data file creation command and the specified file size is "0000," the number of bytes used in a data file definition information set created by the command will be checked. In the other cases, the number of bytes obtained by totaling the number of bytes used in a definition information set created with the specified file size will be checked.

At this time, the size of the current data file is checked. If it is not"0000," an unused size will be computed on the basis of the file size determined in the current data file definition information set and the used size.

If the size of the current data file is"0000," the size of the parent file of the data file will be referred to, and a similar check will be made. In this way, an unused size is computed on the basis of the file size determined in the file definition information set having a value other than "0000" as the final file size as well as the used size.

For example, when a file is created under the file DF1-1 of FIG. 6, because the size of the file is "0000," a file other than a file whose size is "0000" among the files located in the higher-level layers (because in this example, the size of DF1 is also "0000"), i.e., the master file will be checked. On the basis of the size (6000 bytes) of the master file and its used size (3000 bytes), a blank size is determined to be 3000 bytes (6000−3000=3000).

At step ST18, the blank size of the file computed at step ST17 is compared with the size required to create a file on the basis of the file size specified in the command. If the size necessary for file creation is larger than the empty size, control will go to step ST19, where response data will be outputted which indicates that the file size is invalid. Then, control returns to a command wait state.

If the file size is valid, at step ST20, a check will be made to see if the command requires data file creation. If data file creation is required, at step ST21, the smallest of the serial numbers that are not being used by the other data files will be obtained. Namely, at step ST22, a check is made to see if the number of files overflows. In this case, if an unused number is not found, control will proceed to step ST23, where response data will be outputted which indicates that the number of files is invalid. Then control returns to a command wait state. If an unused number is found, the definition information creation process of FIG. 10 will start.

If the command requires a file other than a data file to be created, the top address of a file to be created will be calculated at step ST24 on the basis of the file size specified in the command and the area-group top address stored in the control area 120. Then, the definition information creation process will start.

In the definition information creation process, the definition information sets shown in FIGS. 5A to 5D are created at step ST31, and are written at step ST32.

In the case of data file creation, a file is created using these data items: PTN indicating a data file pattern, the file serial number DFSN retrieved in the previous process, the file serial number PFSN of the parent file of the current file, the length of the data file name specified in the command, the data file name, the file size DFS, AID for specifying data EF to be outputted when this file is selected, and the access condition DFAC. The initial value is set for each of the data file status DFST and the used size US.

In the case of data area creation, a file is created using these data items: PTN indicating a data area pattern, the file serial number DFSN of the parent file of the current file, AID specified in the command, the size ASIZ, the access condition AAC, and the area top address ATOP computed in the previous process. The initial value is set for the status AST of the data area.

In the case of key area creation, a file is created using these data items: PTN indicating a key area pattern, the file serial number DFSN of the parent file of the current file, KID specified in the command, the size KSIZ, the access condition KAC, and the area top address KTOP computed in the previous process. The initial value is set for the status KST of the data area.

The created definition information sets are stored in the area ranging from the directory pointer (the empty area top address) stored in the control area 120 to the address immediately before the area-group top address updated as a result of the file creation. In this case, when the writing of the definition information sets has not been completed properly, control will go from step ST33 to step ST34, where response data will be outputted which indicates that an error has occurred in the writing. Then, control returns to a command wait state.

If the definition information sets have been written properly, control will go to step ST35, where the used sizes of all the data files ranging from the files referred to during the current file size check to the current file are updated or renewed. At this time, if the renewal has not been completed properly, control will go from step ST36 to step ST34, where response data will be outputted which indicates that an error has occurred in the writing. Then, control returns to a command wait state.

If the writing has finished properly, the directory pointer and the area-group top address will be updated at step ST37. At this time, if the renewal has not finished properly, control will go from step ST38 to step ST34, where response data will be outputted which indicates that an error has occurred in the writing. Then, control returns to a command wait state. If the update has finished properly, at step ST39, response data will be outputted which indicates that the update has finished properly. Then, control returns to a command wait state.

Figure 11:
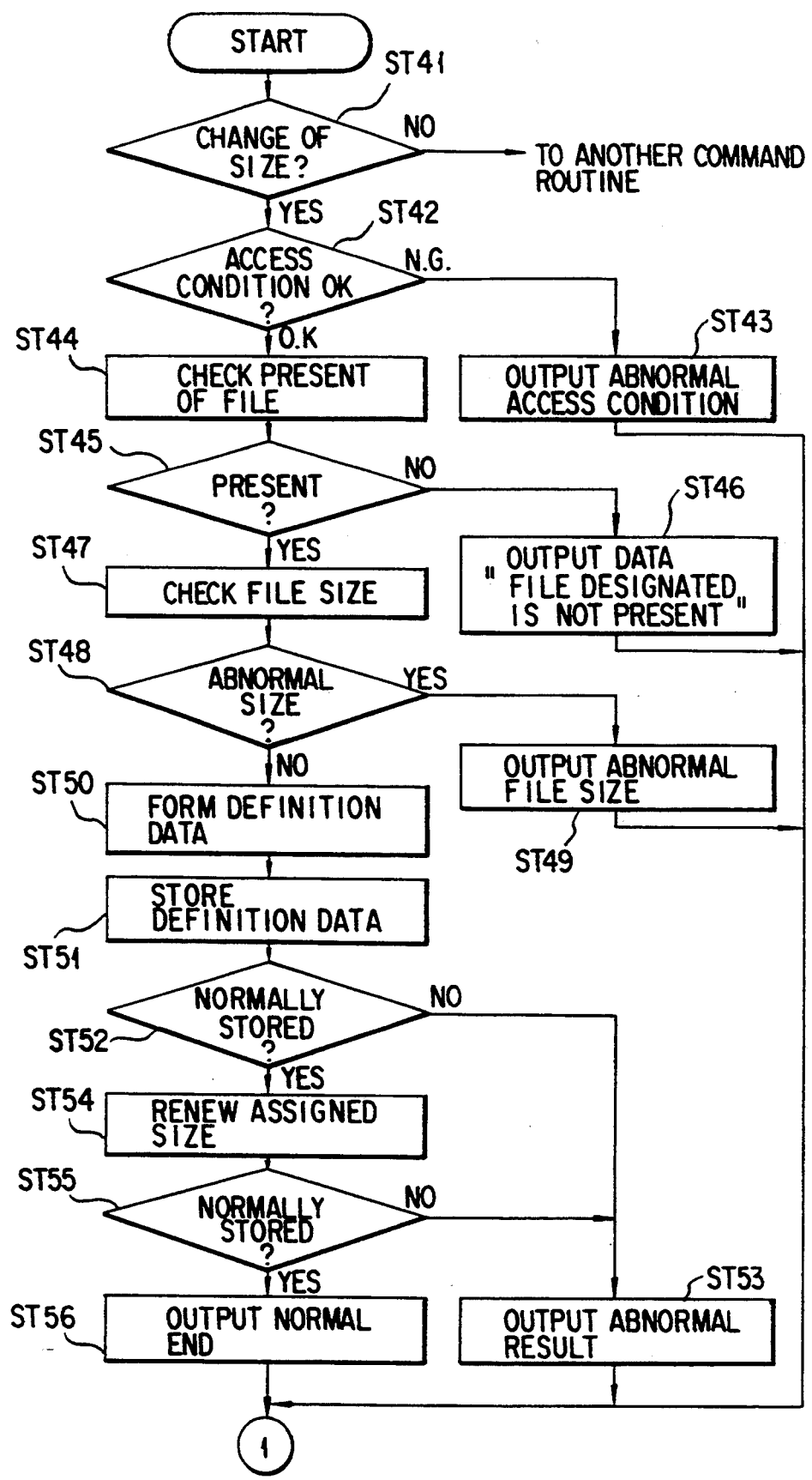
FIG. 11 is a flowchart for explaining the operation of changing a data file.

The file-size renewal function will be described using FIG. 11. As described earlier, each data file retains the file-size data allocated to itself and always recognizes the total size of all the files under itself.

When the size of a file is changed, this is permitted in the range from the upper limit obtained by adding the unused size recognized when the parent file of the current file creates a file to the size allocated to the current file to the lower limit used in the current file.

For example, it is assumed that the current allocated number of bytes is changed in the file DF1-2 in FIG. 6. At this time, because an unused size viewed from the parent file is 300 bytes, the upper limit of a changeable size is 3500 bytes. Because the current used size is 200 bytes, this size is the lower limit.

The file size change is performed on the one specified in the command among the files under the current file.

When a file size change command as shown in FIG. 12 is received, it is recognized on the basis of the function code in the command that the command is a file-size change command. Then, processing is executed according to the flowchart shown in FIG. 11.

Whether or not the command execution conditions are fulfilled is judged on the basis of the collation state and the access conditions determined in the current file. If it is judged that accessing cannot be effected, response data will be outputted which indicates that the access conditions are invalid. Then, control returns to a command wait state.

When it is judged that accessing can be effected, a check will be made to see if the name of the data file to be changed specified in the command is present in the IC card 1. If it is not present, response data will be outputted which indicates that the specified file is not found. Then, control returns to a command wait state.

If it is present, it will be verified whether or not the change size specified in the command is "0000." If it is not "0000," the definition information set about the file (referred to as a reference file) having a value other than "0000" as the file size among the files located in the layers above the specified file will be referred to as explained in connection with the file creation.

At this time, the change range of the specified file size has the upper limit obtained by adding the empty size computed from the definition information about the reference file to the size used for the specified file and the lower limit equal to the size used for the specified file size.

Next, a check is made to see if the change size specified in the command is in the size change range. If it is beyond the range, response data will be outputted which indicates that the size is invalid. Then, control returns to a command wait state. If it is within the range, on the basis of this, a specified file definition information set will be created again.

When the change size specified in the command is "0000," on the basis of this, a specified file definition information set will be created again.

Then, the specified file definition information set is rewritten into the recreated definition information set. At this time, if the writing has not been completed, response data will be outputted which indicates that an error has occurred in the writing. Then, control returns to a command wait state. If the writing has finished properly, the used size specified in the files located in the layers above the specified file will be changed.

If the change size specified in the command is not "0000," the used size will be changed according to the increased or decreased amount of size before and after the size is changed. If it is "0000," the used size will be changed by subtracting the value obtained by subtracting the used size specified in the specified file from the size before the changing from the used size determined in each file located the higher levels.

When an error has occurred in the writing for size changing, response data will be outputted which indicates that an error has occurred in the writing. Then, control returns to a command wait state. If the writing has finished properly, reference data will be outputted which indicates that the writing has finished properly. Then, control returns to a command wait state.

Figure 13:
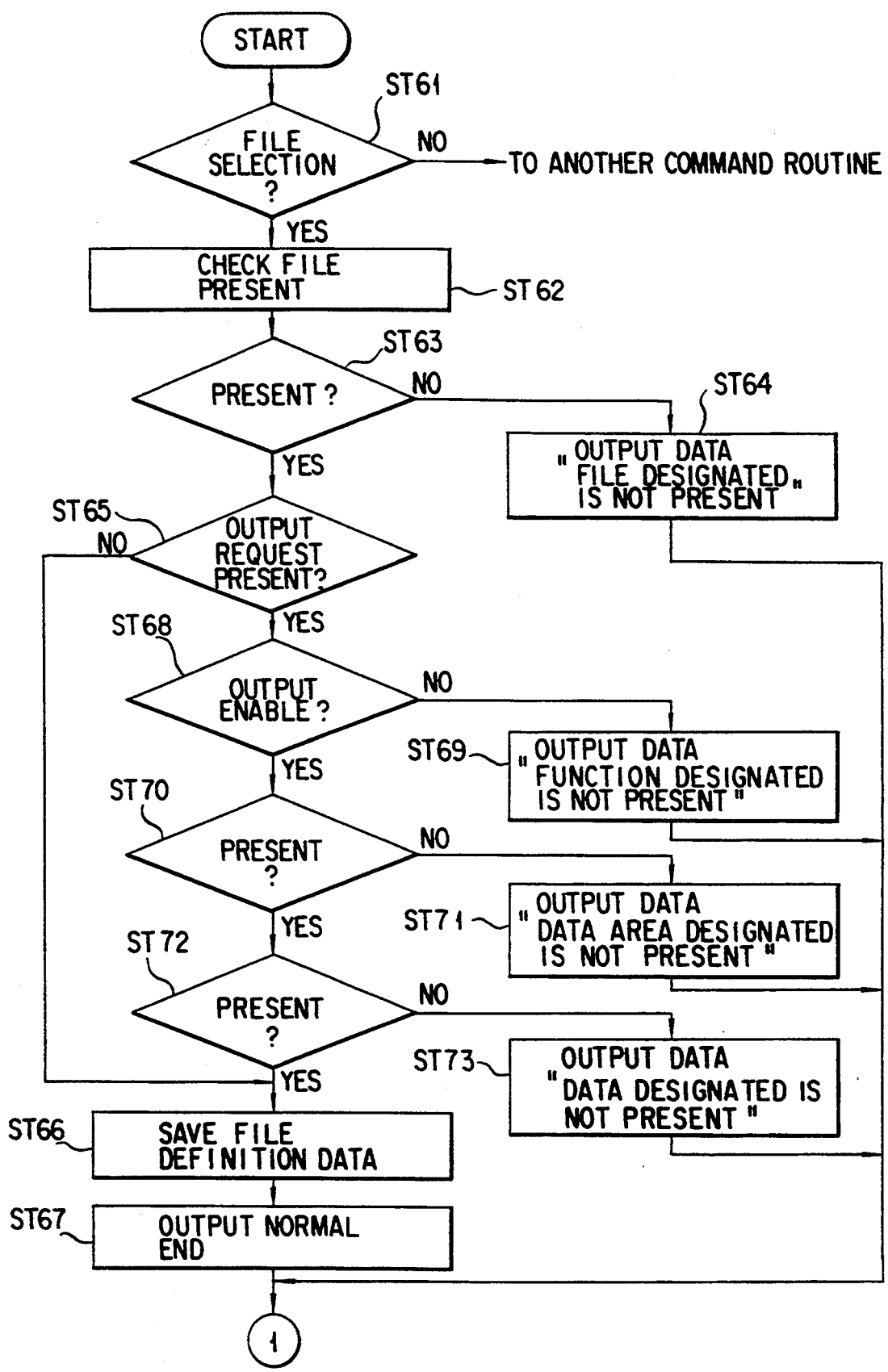
FIG. 13 is a flowchart for explaining the operation of selecting a data file.

Using the flowchart of FIG. 13 and the command format of FIG. 14, the data file select operation for bringing a data file into a current state will be described.

When a data file select command as shown in FIG. 14 is received, on the basis of the function code in the command, it is recognized that the command is a data file select command. Then, processing is effected according to the flowchart shown in FIG. 13.

By extracting the data file name information from the command and searching the directory 121, it is verified whether or not the specified data file is already present. If it is not present, response data will be outputted which indicates that the specified data file is not found. Then, control returns to a command wait state.

If it is present, it will be judged from the SW section in the command whether or not the command has required the file additional information to be outputted. If it has not required, the data file definition information set having the data file name will be stored in a specified location in the working memory 13. Then, response data is outputted which indicates that the process has finished properly, and control returns to a command wait state.

If the output of the file additional information is required, TYPE data in the data file is verified. If the output is disabled, response data will be outputted which indicates that no output function is used. Then, control returns to a command wait state.

If the output is enabled, a check will be made to see if the data area having the AID specified in AAID allocated to the file is present under the file. If it is not present, response data will be outputted which indicates that the data area is not found. Then, control returns to a command wait state.

If it is present, it will be verified whether or not the data that can be outputted is present in the data area. If it is not present, response data will be outputted which indicates that such data is not found. Then, control returns to a command wait state.

If it is present, the definition information set about the data file is stored in a specific location in the working memory 13. Then, response data indicating the normal end is outputted together with the file additional information.

This makes it possible to recognize the information about the current data file referred to by all the command described above, at the time of command execution.

In the above example, in a case where the selected data is found, when the command has not required the output of file additional information, or only when the output of file additional information is required and the response data is stored properly, the current file is created. However, the current state may be created even when response data messages such as "no function," "no data area," "the data not found," EPC are outputted in FIG. 13.

While in the above embodiment, an IC card is used as a device performing file management, the invention is not limit to this. In addition to the IC card, the enclosure may take various shapes such as a stick-like or a block-like enclosure. The invention is not restricted to a portable electronic apparatus. The configuration of the invention may be modified in still other ways without departing from the spirit or essential character of the invention.

While in the above embodiment, on the basis of the size value allocated to the data file, it is judged whether or not file management is carried out, the invention is not limited to this. The judgment may be made in still other ways without departing from the spirit or essential character of the invention. For instance, identification information as to whether or not size management is effected may be set in the data file attribute information (TYPE) shown in FIG. 4B in the embodiment, and judgment may be made on the basis of this information.

Although the IC card in the embodiment uses a contact portion for exchanging data with an external unit, the data exchange may be effected by using light, electric field, or magnetic field without physical contact with an external unit.

As has been explained in detail, according to the present invention, it is possible to provide a file management system which eliminates the necessity of setting the upper limit on the size of a data file corresponding to an application, enables areas to be added when necessary at the time of execution, and allows mixing use of applications with and without the file size limits.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A file management apparatus having a memory including a main file, a first file and a second file, the first and second files being arranged in a lower class of the main file, comprising:

storage means for storing first definition information for defining an allocated size and a used size of the main file, second definition information for defining an allocated size and a used size of the first file, and third definition information for defining that size management of the second file should not be performed;

first calculation means for calculating an unused size of the first file according to the second definition information stored in said storage means when a third file is to be arranged in a lower class of the first file;

first determining means for determining whether the size of the third file is included within a range of the unused size of the first file in accordance with a calculation result of the first calculation means;

first writing means for writing into said storage means a fourth definition information representing an allocated size of the third file when it is determined from the calculation result of the first calculation means that the third file size is within the unused size of the first file;

second calculation means for calculating an unused size of the main file based on the first definition information stored in said storage means when a fourth file to be positioned in a lower class of said second file of which third definition information representing that the size management thereof is not performed is stored in said storage means;

second determining means for determining whether the size of the fourth file is included within the unused size of the main file in accordance with a calculation result of the second calculation means; and second writing means for writing into said storage means a fifth definition information representing an allocated size of the fourth file when it is determined from the calculation result of the second calculation means that fourth file size to be formed is within the unused size of the main file.

2. A file management apparatus according to claim 1, further comprising:

means for defining the plurality of files as upper order files and lower order files depending on the upper order files.

3. A file management apparatus according to claim 2, further comprising:

means for detecting an instruction to create a new file under a file instructed that the size management thereof should not be performed;

means for detecting a size-managed upper file from the upper files in accordance with a detection result of said detecting means;

means for creating the new file having a size within unused areas allocated to the size-managed upper file; and means for renewing the file size of the size-managed upper file according to creation of the new file.

4. A file management apparatus according to claim 1, further including means for setting a specific value for a file size to designate that size management should not be performed in each file.

5. A file management apparatus according to claim 1, further comprising:

means for detecting an instruction to create a new file under a file instructed that the size management thereof should not be performed;

means for detecting a size-managed upper file from the upper files in accordance with a detection result of said detecting means;

means for varying a size of another file depending to the size-managed upper file within an unused range allocated to the size-managed upper file; and means for renewing the file size of the size-managed upper file according to creation of the new file.

6. A file management apparatus according to claim 1, further comprising:

means for storing an accessing condition for accessing a selected file of the main file and the first to fourth files as another definition information; and means, when a new file is being created, for confirming whether the new file satisfies the accessing condition of an upper class file of the new file.

7. An IC card having a memory divided into a plurality of files including upper class files and lower class files depending to the upper class files to form a hierarchical file structure comprising:

definition information storage means for storing definition information including identification information representing the respective files, parent file designation information representing a parent file of the respective files, size definition information representing sizes of the files and a fact that no size definition should be performed, and information representing a used size of the respective files;

determining means for determining whether a size of a file to be processed is defined in accordance with the size definition information;

calculation means for calculating, when the determining means determines that the size of the file to be processed is defined, an unused size of the file to be processed according to the definition information thereof stored in said definition information storage means, and when the determining means determines that the size of the file to be processed is not defined, an unused size of the parent file according to the definition information stored in the definition information storage means;

first processing means for writing data into the file to be processed within the size thereof calculated by said calculation means when it is determined by said determining means that the size of the file to be processed is defined; and second processing means for writing data into the file to be processed within the unused size of the parent file calculated by said calculation means when it is determined by said determining means that the size of the file to be processed is not defined.

8. An apparatus according to claim 7, further comprising:

file defining means for defining the plurality of files as upper order files and lower order files depending on the upper order files.

9. An apparatus according to claim 8, further comprising:

means for detecting an instruction to create a new file under a file instructed that the size management thereof should not be performed;

means for detecting a size-managed upper file from the upper files in accordance with a detection result of said instruction detecting means;

means for creating the new file having a size defined within an unused range allocated to the size-managed upper file; and means for renewing the file size of the size-managed upper file according to creation of the new file.

10. An apparatus according to claim 7, wherein said file defining means includes a table means for storing file dependency data in data file definition word in a directory set in said memory.

11. A file management apparatus having a memory including a main file, first and second files respectively positioned in a lower class of the main file, a third file positioned in a lower class of the first file, and a fourth file arranged at a lower class of the second file, comprising:

storage means for storing first definition information for defining an allocated size and a used size of the main file, second definition information for defining an allocated size and a used size of the first file, third definition information for defining that size management of the second file should not be performed, fourth definition information for defining an allocated size and a used size of the third file, and fifth definition information for defining an allocated size and a used size of the fourth file;

first calculation means for calculating an unused size of the first file of the upper class in accordance with the second definition when the size of the third file is being changed;

first determining means for determining whether the change of the file size is possible from the unused size of the first file calculated by the first calculation means and a changed size of the third file;

first means for changing the size of the third file when it is determined by the first determining means that the change of the file size is possible;

second calculation means for calculating an unused size of the main file of a size-determined upper file in accordance with the first definition information when the size of the fourth file is to be changed;

second determining means for determining whether the change of the file size is possible from the unused size of the main file calculated by the second calculation means and a changed size of the fourth file; and second means for changing the size of the fourth file when it is determined by the second determining means that the change of the file size is possible.

12. An apparatus according to claim 11, wherein said second means includes means for writing data into the interested file within a range of unused size of an upper order file.

13. An apparatus according to claim 11, wherein said second means includes means for varying a data size of another file depending on the upper order file within a range of unused size of an upper order file.

14. An apparatus according to claim 11, further comprising means for changing the size data stored in said storage means to specified data representing that a size is not defined.

15. An apparatus according to claim 11, wherein said second means includes means for creating a new file depending on the interested file within a range of unused size of an upper order file.

16. A file management apparatus according to claim 11, further comprising changing means for changing, by said first means, the size of the data file definition information corresponding to a data file designated by a command data into information representing that no size management is being performed, when the change size information represents that no size management is being performed without calculating an unused size by said calculation means and performing the determination by said determining means.

17. A file management apparatus according to claim 11, further comprising:
   means for storing an accessing condition for accessing a selected file of the main file and the first to fifth files as another definition information; and
   means, when a new file is being created, for confirming whether the new file satisfies the accessing condition of an upper class file of the new file.

* * * * *